US012587024B2

(12) United States Patent
Lei et al.

(10) Patent No.: US 12,587,024 B2
(45) Date of Patent: Mar. 24, 2026

(54) CONTROL METHOD OF POWER SUPPLY AND PORTABLE ELECTRONIC DEVICE INCLUDING RESERVED BATTERY CAPACITY CONTROL

(71) Applicant: Wistron Corporation, New Taipei City (TW)

(72) Inventors: Chung-Kai Lei, New Taipei City (TW); Kuan-Yu Chen, New Taipei City (TW); Ching-Wen Chou, New Taipei City (TW)

(73) Assignee: Wistron Corporation, New Taipei City (TW)

(*) Notice: Subject to any disclaimer, the term of this patent is extended or adjusted under 35 U.S.C. 154(b) by 1179 days.

(21) Appl. No.: 17/392,279

(22) Filed: Aug. 3, 2021

(65) Prior Publication Data

US 2022/0385086 A1 Dec. 1, 2022

(30) Foreign Application Priority Data

May 31, 2021 (TW) .................................. 110119611

(51) Int. Cl.
*H02J 7/00* (2006.01)
(52) U.S. Cl.
CPC .......... *H02J 7/0063* (2013.01); *H02J 7/0048* (2020.01); *H02J 7/005* (2020.01)
(58) Field of Classification Search
CPC .... H04W 52/0261–0296; G06F 132/12; H02J 7/0063; H02J 7/00306; H02J 2310/22; H02J 9/002
See application file for complete search history.

(56) References Cited

U.S. PATENT DOCUMENTS

| | | | | |
|---|---|---|---|---|
| 9,880,610 B2 | 1/2018 | Liu | | |
| 2010/0079113 A1* | 4/2010 | Cromer | ................. | H02J 7/0063 |
| | | | | 320/136 |
| 2012/0295574 A1* | 11/2012 | Chen | ................... | H02J 7/00712 |
| | | | | 455/574 |
| 2012/0327749 A1* | 12/2012 | Tsukamoto | ........... | G06F 1/3212 |
| | | | | 368/204 |
| 2018/0226823 A1* | 8/2018 | Ashcraft | ............... | H02J 7/1423 |
| 2021/0018970 A1 | 1/2021 | Ho | | |

FOREIGN PATENT DOCUMENTS

| | | |
|---|---|---|
| CN | 102841668 A | 12/2012 |
| CN | 103890693 A | 6/2014 |
| CN | 104808761 A | 7/2015 |

(Continued)

*Primary Examiner* — David V Henze-Gongola
(74) *Attorney, Agent, or Firm* — Winston Hsu

(57) ABSTRACT

A control method of power supply for a portable electronic device is disclosed. The portable electronic device includes a power supply module and a control circuit, and the power supply module is configured to provide electric power to the portable electronic device. The control method of power supply includes detecting, by the control circuit, a system status of the portable electronic device or a module status of the power supply module; and adjusting, by the control circuit, a reserved battery capacity of a main battery of the power supply module according to the system status of the portable electronic device or the module status of the power supply module.

18 Claims, 4 Drawing Sheets

(56) References Cited

FOREIGN PATENT DOCUMENTS

| CN | 107069860  | A  | 8/2017  |
| CN | 109216814  | A  | 1/2019  |
| CN | 110320991  | A  | 10/2019 |
| JP | 2000354336 | A  | 12/2000 |
| TW | 201329694  | A1 | 7/2013  |
| TW | 201418959  | A  | 5/2014  |

* cited by examiner

CONTROL METHOD OF POWER SUPPLY AND PORTABLE ELECTRONIC DEVICE INCLUDING RESERVED BATTERY CAPACITY CONTROL

BACKGROUND OF THE INVENTION

1. Field of the Invention

The present invention relates to a control method of a power supply and a related portable electronic device, and more particularly, to a control method of a power supply and a related portable electronic device capable of dynamically adjusting a reserved battery capacity.

2. Description of the Prior Art

With the advancement and development of technology, conventional electronic devices can reach improved performance. As consumers demand reduced costs and smaller electronic devices, a lithium-ion battery of a real-time clock (RTC) button battery of an electronic device such as a laptop is utilized as a voltage source. The power supply system of a conventional laptop has no reserved battery capacity, meaning that a total battery capacity of the power supply system is equivalent to the battery capacity displayed on the operating system (OS) of the electronic device, e.g. when a real battery capacity is 0%, the battery capacity displayed on the OS of the electronic device is 0%. In a modification, the conventional laptop power supply system has a fixed reserved battery capacity, so that when the real battery capacity is 1% (for example), the battery capacity displayed on the OS of the electronic device is 0%. This can prevent permanent failure due to over power consumption of the battery. Since different battery cells have different characteristics, however, the efficiency of the battery cell may be affected by a system loading, a system battery capacity or a battery voltage when a same battery cell is applied to different electronic devices. Therefore, improvements to a conventional power supply system of an electronic system are necessary.

SUMMARY OF THE INVENTION

In light of this, the present invention provides a control method of a power supply and a related portable electronic device which can dynamically adjust a reserved battery capacity.

An embodiment of the present invention discloses a power supply control method for a portable electronic device including a power supply module and a control circuit. The power supply module is configured to provide power to the portable electronic device. The power supply control method comprises: detecting, by the control circuit, a system status of the portable electronic device or a module status of the power supply module; and adjusting, by the control circuit, a reserved battery capacity of a main battery of the power supply module according to the system status of the portable electronic device or the module status of the power supply module.

Another embodiment of the present invention discloses a portable electronic device, comprising: a power supply module, including a main battery configured to provide power to the portable electronic device; and a control circuit, coupled to the power supply module, configured to detect a system status of the electronic device or a module status of the power supply module, and to adjust a reserved battery capacity of the main battery of the power supply module according to the system status of the portable electronic device or the module status of the power supply module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
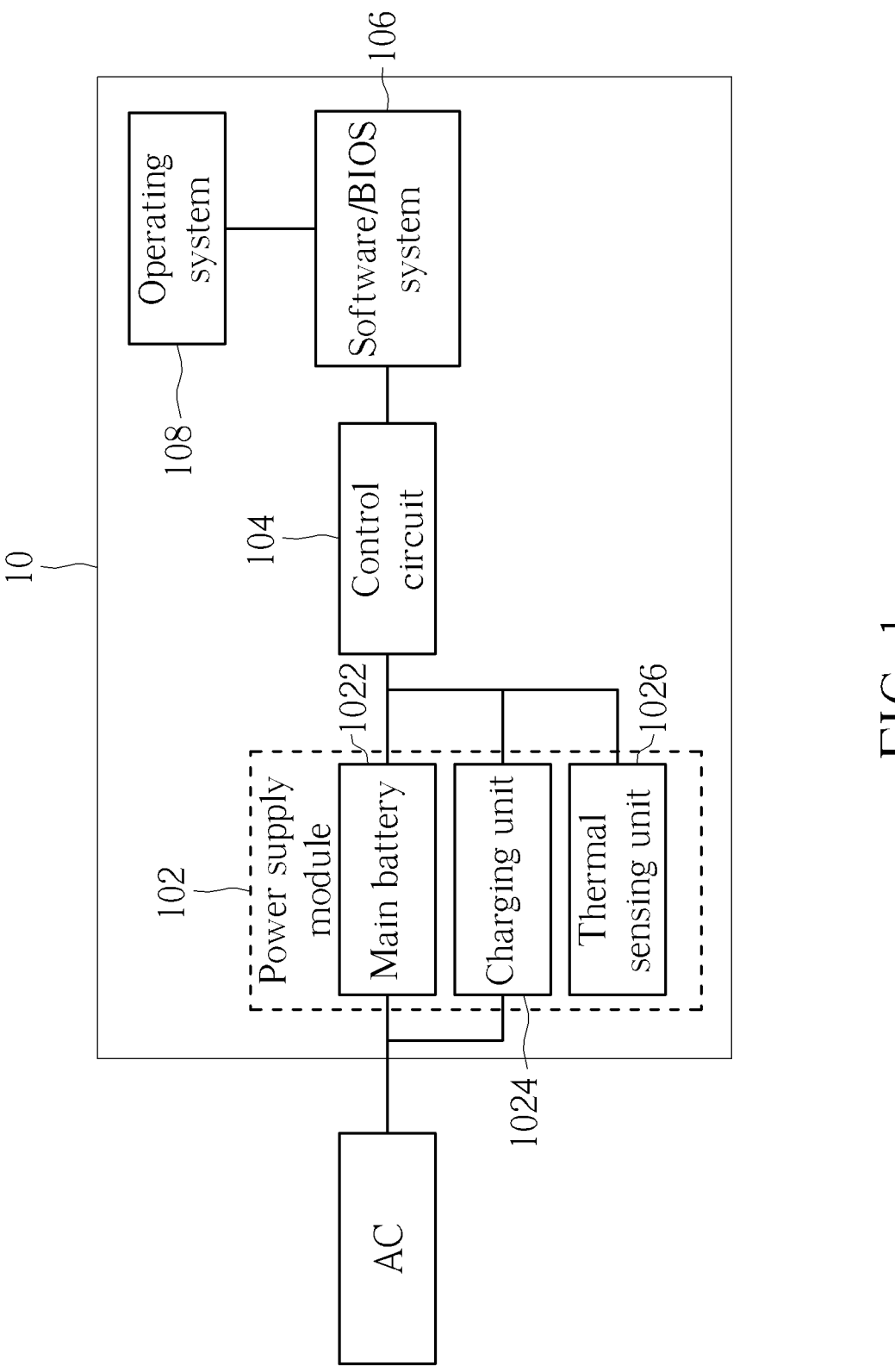
FIG. 1 and FIG. 2 are schematic diagrams of a portable electronic device according to an embodiment of the present invention.

Refer to FIG. 1, which is a schematic diagram of a portable electronic device 10 according to an embodiment of the present invention. The portable electronic device 10 may be a laptop or an electronic device with a lithium-ion battery. The portable electronic device 10 includes a power supply module 102 and a control circuit 104. The power supply module 102 may include a main battery 1022, which is coupled to an alternating current AC, to transform the alternating current AC into a power supply voltage and store the power supply voltage. In an embodiment, the power supply module 102 may be a battery module, which cannot be separated from the portable electronic device 10, and the portable electronic device 10 does not include any other battery module. Alternatively, in another embodiment, the power supply module 102 may be a battery module, which can be separated from the portable electronic device 10, and the portable electronic device 10 may include other battery modules, e.g. a real-time clock (RTC) battery. The control circuit 104 may be an embedded controller (EC), coupled to the power supply module 102, and the control circuit 104 may be coupled to a central processing unit (CPU) for detecting a system status of the portable electronic device 10 or a module status of the power supply module 102, such that the control circuit 104 may adjust a reserved battery capacity of the power supply module 102 according to the system status of the portable electronic device 10 or the module status of the power supply module 102, wherein the module status of the power supply module 102 may be a battery temperature, a battery health or a voltage of the main battery 1022.

In detail, the main battery 1022 of the power supply module 102 may include a battery gas-gauge IC. The battery gas-gauge IC is configured to measure the battery capacity, which includes information of relative state of charge (RSOC), remaining capacity, full charge capacity (FCC), voltage, current, temperature and health. The battery gas-gauge IC is configured to transmit the module status associated with the power supply module 102 via a system management bus (SMBus) to the control circuit 104. In an embodiment, the portable electronic device 10 may further include a charging unit 1024 and a thermal sensing unit 1026, as shown in FIG. 1. The charging unit 1024 may be coupled to the alternating current AC and the control circuit 104, such that the charging unit 1024 is charged by the alternating current AC. The thermal sensing unit 1026 is coupled to the control circuit 104 via the SMBus. Therefore, the control circuit 104 may receive the status information of the main battery 1022.

In addition, the portable electronic device 10 may further include a software/BIOS system 106, an operating system (OS) 108, wherein the software/BIOS system 106 may be coupled to the control circuit 104 via an enhanced serial peripheral interface bus (eSPI), the OS 108 may perform transmissions with the software/BIOS system 106 via an advanced configuration and power interface (ACPI). Therefore, the portable electronic device 10 may transmit an adjustment result related to the power supply module 102 and determined by the control circuit 104 to the software/BIOS system 106 and the OS 108, such that the software/BIOS system 106 and the OS 108 may display related information on the portable electronic device 10.

Figure 2:
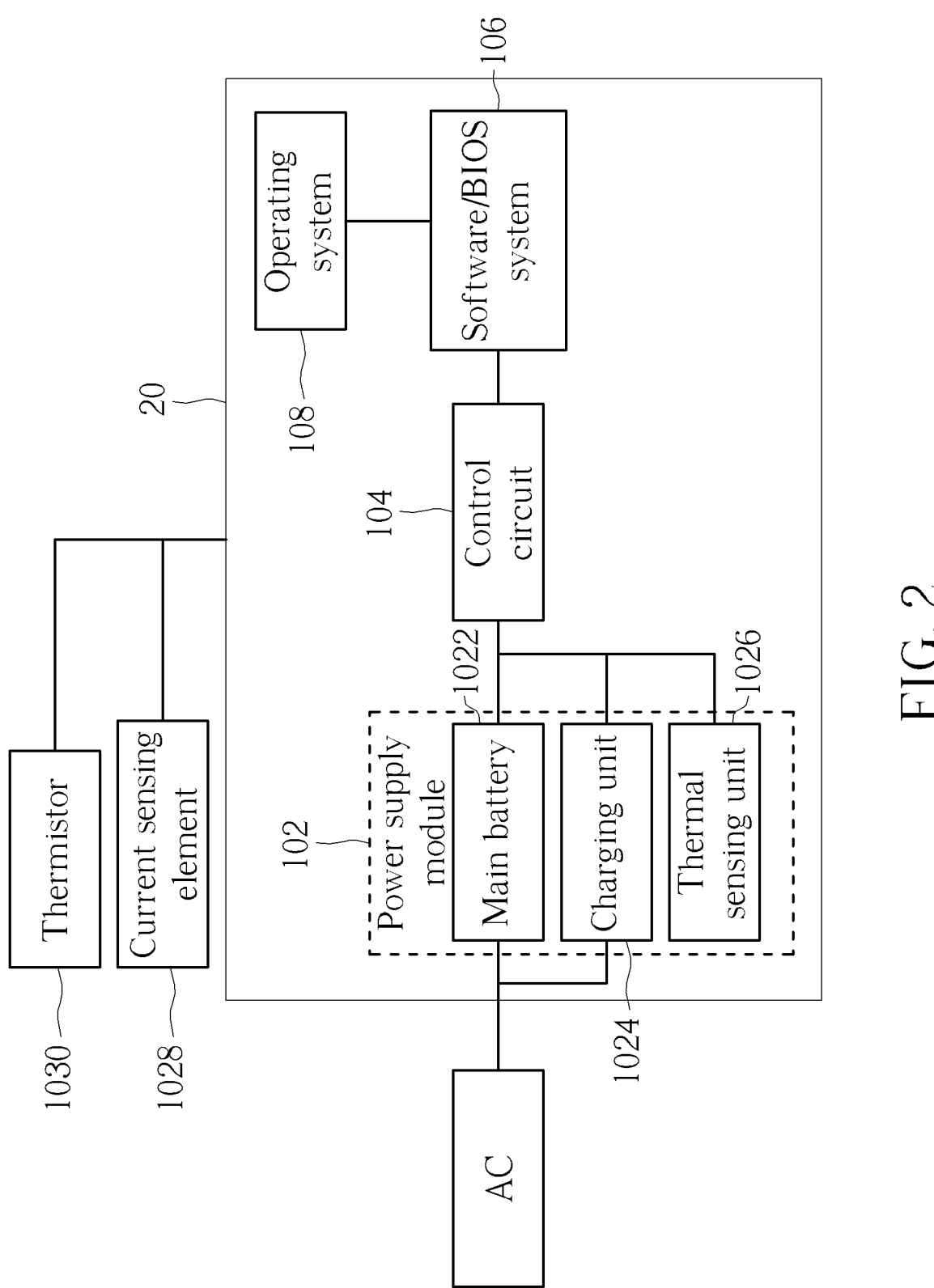

Refer to FIG. 2, which is a schematic diagram of a portable electronic device 20 according to another embodiment of the present invention. Since the portable electronic device 20 is a variation of the portable electronic device 10, the elements with identical functions to those in FIG. 1 use the same numerals. Compared to the portable electronic device 10, the portable electronic device 20 may be coupled to an external hardware, e.g. a current sensing element 1028 and a thermistor 1030, wherein the current sensing element 1028 and the thermistor 1030 may respectively sense the current and the temperature of the main battery 1022 so as to provide corresponding information to the control circuit 104 of the portable electronic device 20.

Figure 3:
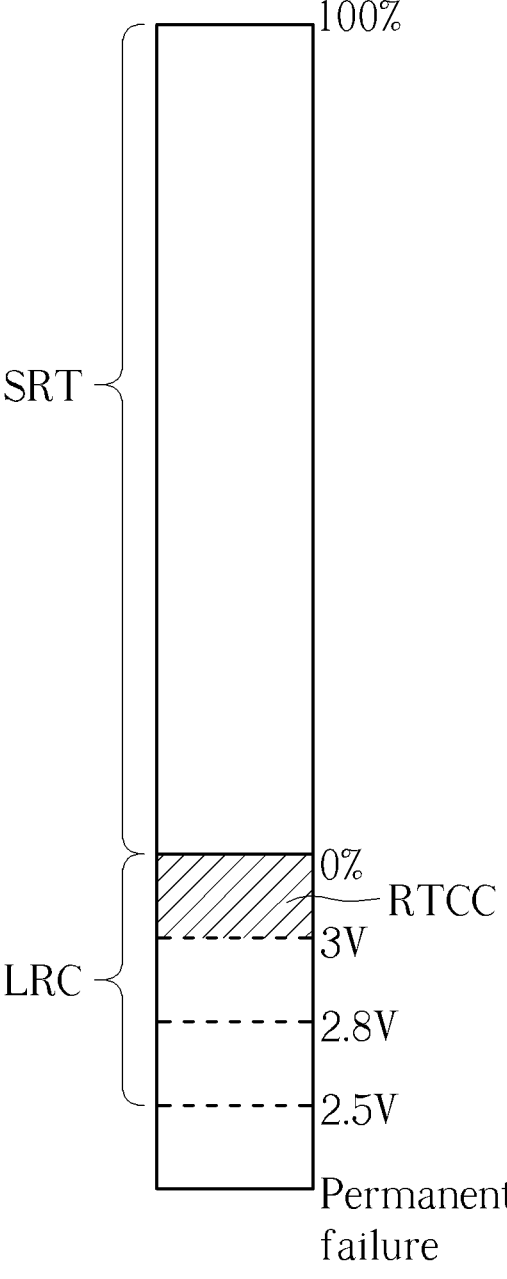
FIG. 3 is a schematic diagram of a battery capacity status according to an embodiment of the present invention.

Refer to FIG. 3, which is a schematic diagram of a battery capacity status according to an embodiment of the present invention. As can be known from FIG. 3, when the battery capacity of the main battery 1022 of the power supply module 102 is 100%, the run-time system battery capacity of the portable electronic devices 10, 20 are fully charged, i.e. the battery capacity of the OS 108 of the portable electronic devices 10, 20 provided by the main battery 1022 is fully charged; when the battery capacity of the main battery 1022 of the power supply module 102 is 0%, the run-time system battery capacity of the portable electronic devices 10, 20 is 0%. In this situation, a lowest remaining capacity LRC is maintained by the main battery 1022 of the power supply module 102 even when the run-time system battery capacity of the portable electronic devices 10, 20 is 0%. In other words, the lowest remaining capacity LRC of the main battery 1022 is an embodiment of the reserved battery capacity. In an embodiment, the main battery 1022 of the power supply module 102 may provide power for a real-time clock (RTC) circuit of the portable electronic device 20 to maintain real-time information of the portable electronic devices 10, 20. The lowest remaining capacity LRC may be further divided into stages of 3 volts/single battery cell, 2.8 volts/single battery cell, 2.5 volts/single battery cell and permanent failure provided by the main battery 1022 of a single battery cell. When the battery capacity of the main battery 1022 is 3 volts/single battery cell, the displayed battery capacity of the OS 108 is 0%; When the battery capacity of the main battery 1022 is 2.8 volts/single battery cell, a low voltage protection point of the main battery 1022 is reached; When the battery capacity of the main battery 1022 is 2.5 volts/single battery cell, the main battery 1022 may stop providing voltage to the real-time clock circuit; when the main battery 1022 is over discharged, the main battery 1022 reaches permanent failure and can no longer be utilized.

In the above embodiments, the control circuit 104 of the portable electronic devices 10, 20 may adjust the reserved battery capacity of the power supply module 102 of the portable electronic devices 10, 20 according to the system status of the portable electronic devices 10, 20 or the module status of the power supply module 102. Furthermore, in an embodiment, the control circuit 104 according to an embodiment of the present invention may adjust a ratio of a run-time system battery capacity SRT of the OS 108 of the portable electronic devices 10, 20 to the lowest remaining capacity LRC of the power supply module 102. In other words, the control circuit 104 may dynamically adjust a real-time clock capacity RTCC of the real-time clock circuit of the lowest remaining capacity LRC, e.g. when the battery capacity of the main battery 1022 is 3000 mAh, the control circuit 104 may keep 1% (i.e. 30 mAh) battery capacity of the main battery 1022 as the real-time clock capacity RTCC for the real-time clock circuit, such that the risk of over-discharging is reduced. In this embodiment, the ratio of the run-time system battery capacity SRT of the OS 108 of the portable electronic devices 10, 20 to the lowest remaining capacity LRC of the power supply module 102 is 100:1.

Figure 4:
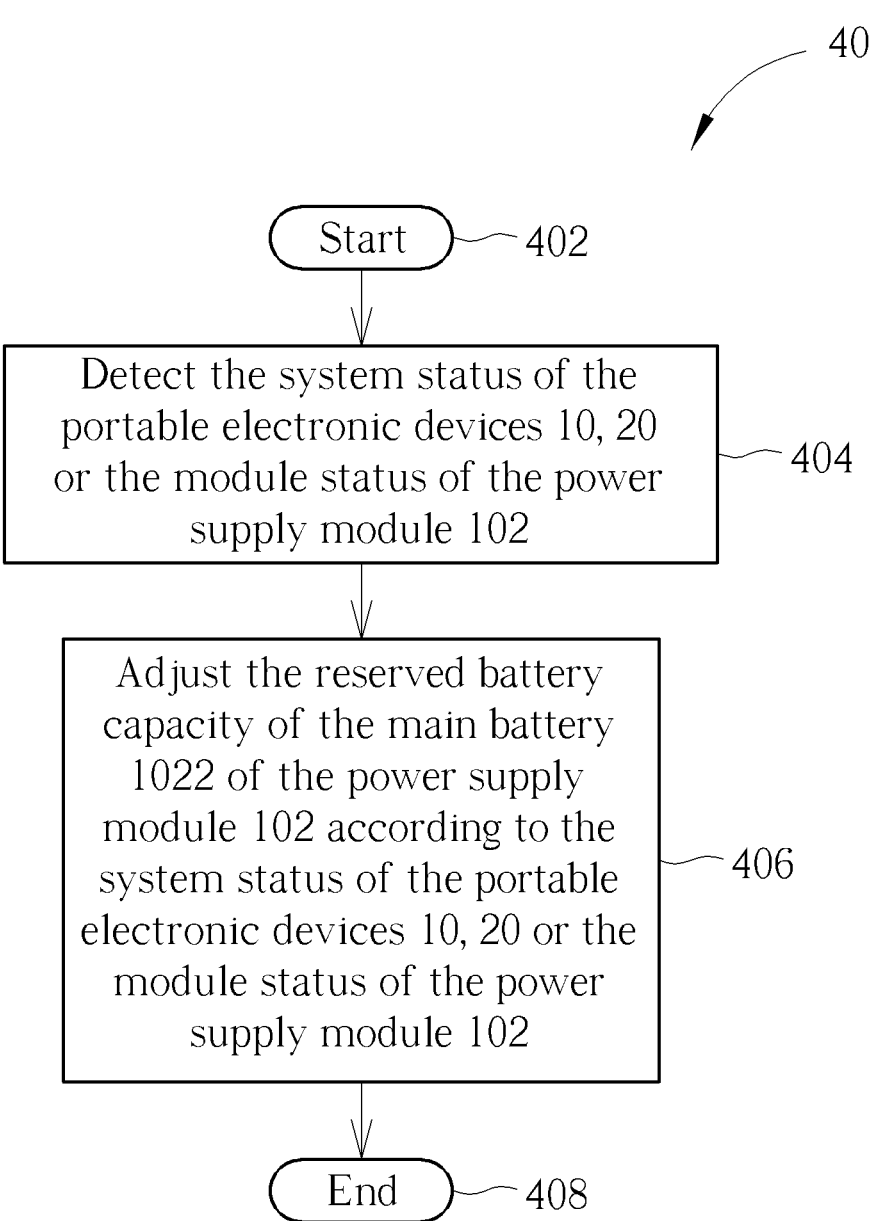
FIG. 4 is a schematic diagram of a power supply control method according to an embodiment of the present invention.

Furthermore, an operation method of the portable electronic devices 10, 20 may be represented by a power supply control method 40, as shown in FIG. 4. The power supply control method 40 includes the following steps:

Step 402: Start.

Step 404: Detect the system status of the portable electronic devices 10, 20 or the module status of the power supply module 102.

Step 406: Adjust the reserved battery capacity of the main battery 1022 of the power supply module 102 according to the system status of the portable electronic devices 10, 20 or the module status of the power supply module 102.

Step 408: End.

In detail, before executing the power supply control method 40, the control circuit 104 may set 1% of the battery capacity as a remaining capacity initial RCI1, which is equivalent to 0% battery capacity of the OS 108 of the portable electronic devices 10, 20, i.e. when the battery capacity of the main battery 1022 is 4000 mAh, an initial reserved battery capacity RCI1 is 40 mAh. In this embodiment, a system leakage current IL is a system consumption generated by interior elements of the portable electronic devices 10, 20 when in a power-off status, meaning the control circuit 104 may set different reserved battery capacities corresponding to different system leakage currents IL of the main battery 1022 in advance. For example, the control circuit 104 may set the reserved battery capacities [RCI2, RCI3, RCI4, RCI5]=[60, 80, 100, 120] mAh corresponding to the leakage current I [Ith1, Ith2, Ith3, Ith4]=[5, 10, 15, 20] μA, i.e. the leakage currents Ith1, Ith2, Ith3, Ith4 are thresholds corresponding to different reserved battery capacities RCI2, RCI3, RCI4, RCI5. Therefore, when the control circuit 104 detects that the system leakage current IL of the portable electronic devices 10, 20 are smaller than the leakage current Ith1, no adjustment is made to the reserved battery capacity; when the control circuit 104 detects that the system leakage current IL of the portable electronic devices 10, 20 are larger than the leakage current Ith1 but smaller than the leakage current Ith2, the reserved battery capacity RCI1 is adjusted to the reserved battery capacity RCI2 (i.e. 60 mAh); and when the control circuit 104 detects that the system leakage current IL of the portable electronic devices 10, 20 are larger than the leakage current Ith2 but smaller than the leakage current Ith3, the reserved battery capacity RCI2 is adjusted to the reserved battery capacity RCI3 (i.e. 80 mAh). Similarly, the reserved battery capacity is dynamically adjusted. Notably, when the portable electronic devices 10, 20 are in the power-off status, the power of the control circuit 104 is provided by the real-time clock circuit, enabling the system status of the portable electronic devices 10, 20 or the module status of the power supply module 102 to still be obtained in order to monitor the system leakage current IL of the portable electronic devices 10, 20 for dynamically adjusting the reserved battery capacity when the portable electronic devices 10, 20 are in the power-off status or rebooting. In addition, the above leakage current thresholds corresponding to different reserved battery capacities are not limited thereto, and may be modified according to different users or system requirements.

In another embodiment, the control circuit 104 may dynamically adjust the reserved battery capacity according to a battery temperature T of the main battery 1022. Before executing the power supply control method 40, the control circuit 104 may set 1% of the battery capacity as an initial reserved battery capacity RCT1, i.e. when the battery capacity of the main battery 1022 is 4000 mAh, the initial reserved battery capacity RCT1 is 40 mAh. Then, the control circuit 104 may set different reserved battery capacities corresponding to different battery temperatures T of the main battery 1022 in advance. For example, the control circuit 104 may set the reserved battery capacities [RCT2, RCT3, RCT4, RCT5]=RCT1*[110%, 120%, 130%, 140%] corresponding to the battery temperature T [Tth1, Tth2, Tth3, Tth4]=[45, 50, 55, 60]° C., i.e. the battery temperatures Tth1, Tth2, Tth3, Tth4 are thresholds corresponding to different reserved battery capacities RCT2, RCT3, RCT4, RCT5. Therefore, when the control circuit 104 detects that the battery temperature T is smaller than the battery temperature Tth1, no adjustment is made to the reserved battery capacity; when the control circuit 104 detects that the battery temperature T is larger than the battery temperature Tth1 but smaller than the battery temperature Tth2, the reserved battery capacity RCT1 is adjusted to the reserved battery capacity RCT2 (i.e. RCT1*110%); and when the control circuit 104 detects that the battery temperature T is larger than the battery temperature Tth2 but smaller than the battery temperature Tth3, the reserved battery capacity RCT2 is adjusted to the reserved battery capacity RCT3 (i.e. RCT1*120%). Similarly, the reserved battery capacity is dynamically adjusted. Notably, the control circuit 104 may constantly monitor the battery temperature T when the portable electronic devices 10, 20 are in the power-off status, such that the reserved battery capacity may be dynamically adjusted when the portable electronic devices 10, 20 are in the power-off status or rebooting. In addition, the above battery temperature thresholds corresponding to different reserved battery capacities are not limited thereto, and may be modified according to different users or system requirements.

In another embodiment, the control circuit 104 may dynamically adjust the reserved battery capacity according to a battery health SOH of the main battery 1022. Before executing the power supply control method 40, the control circuit 104 may set 1% of the battery capacity as an initial reserved battery capacity RCS1, i.e. when the battery capacity of the main battery 1022 is 4000 mAh, the initial reserved battery capacity RCT1 is 40 mAh. Then, the control circuit 104 may set different reserved battery capacities corresponding to different battery health SOH of the main battery 1022 in advance. For example, the control circuit 104 may set the reserved battery capacities [RCS2, RCS3, RCS4, RCS5] =RCS1*[110%, 120%, 130%, 140%] corresponding to the battery health SOH [SOHth1, SOHth2, SOHth3, SOHth4] =[90%, 80%, 70%, 60%], i.e. the battery health SOHth1, SOHth2, SOHth3, SOHth4 are thresholds corresponding to different reserved battery capacities RCS2, RCS3, RCS4, RCS5. Therefore, when the control circuit 104 detects that the battery health SOH is larger than the battery health SOHth1, no adjustment is made to the reserved battery capacity; when the control circuit 104 detects that the battery health SOH is smaller than the battery health SOHth1 but larger than the battery health SOHth2, the reserved battery capacity RCS1 is adjusted to the reserved battery capacity RCS2 (i.e. RCS1*110%); and when the control circuit 104 detects that the battery health SOH is smaller than the battery health SOHth2 but larger than the battery health SOHth3, the reserved battery capacity RCS2 is adjusted to the reserved battery capacity RCT3 (i.e. RCS1*120%). Similarly, the reserved battery capacity is dynamically adjusted. Notably, the control circuit 104 may constantly monitor the battery health SOH when the portable electronic devices 10, 20 are in the power-off status, such that the reserved battery capacity may be dynamically adjusted when the portable electronic devices 10, 20 are in the power-off status or rebooting. In addition, the above battery health thresholds corresponding to different reserved battery capacities are not limited thereto, and may be modified according to different users or system requirements.

In another embodiment, the control circuit 104 may dynamically adjust the reserved battery capacity according to the battery voltage V of the main battery 1022. Before executing the power supply control method 40, the control circuit 104 may set 1% of the battery capacity as a remaining capacity initial RCV, i.e. when the battery capacity of the main battery 1022 is 4000 mAh, the remaining capacity initial RCV is 40 mAh. Since a conventional battery configuration of the main battery 1022 may be a battery pack including multiple battery cells in series, the control circuit 104 according to an embodiment of the present invention may set a lowest battery pack voltage Vpack of four battery cells in series and a lowest battery cell voltage Vcell in advance, e.g. [Vpack, Vcell]=[12V, 3V]. Therefore, when the control circuit 104 detects that a battery pack voltage is larger than 12V or a single battery cell voltage is larger than 3V, no adjustment is made to the reserved battery capacity; and when the battery pack voltage is smaller than 12V or the single battery cell voltage is smaller than 3V, the run-time system battery capacity of the portable electronic devices 10, 20 are directly adjusted to 0% to dynamically adjust the reserved battery capacity. Notably, the control circuit 104 may constantly monitor the battery voltage when the portable electronic devices are in the power-off status, such that the reserved battery capacity may be dynamically adjusted when the portable electronic devices 10, 20 are in the power-off status or rebooting.

Triggering the adjustments of the run-time system battery capacity of the portable electronic devices 10, 20 are not limited to the above examples, and may be modified according to different users or system requirements, e.g. the lowest battery cell voltage Vcell may be 3.1 V or 3.2 V and the lowest battery pack voltage Vpack of four battery cells may be 12.4 V or 12.8 V. The invention is not limited to these examples.

The control circuit 104 may dynamically adjust the reserved battery capacity according to at least one of the system status or the main battery 1022 of the portable electronic devices 10, 20, and is not limited to a single condition. For example, the control circuit 104 may adjust the reserved battery capacity according to the system leakage current IL of the portable electronic devices 10, 20 and the battery temperature T of the main battery 1022 at the same time. Alternatively, the control circuit 104 may adjust the reserved battery capacity according to the battery temperature T and the battery voltage V of the main battery 1022.

Notably, the above embodiments are for illustrating concepts of the present invention; those skilled in the art may make appropriate modifications. For example, the status of the main battery 1022 and the system status of the portable electronic devices 10, 20 for adjusting the reserved battery capacity by the control circuit 104 are not limited to the above embodiments. Other battery conditions, e.g. battery life and system loading of the portable electronic device, are applicable to the present invention, and may be modified according to user or system requirements.

In summary, the present invention provides a power supply control method and a related portable electronic device, which dynamically adjusts a reserved battery capacity to avoid permanent failure because of over consumption of the battery capacity of the portable electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply control method for a portable electronic device including a power supply module and a control circuit, the power supply module being configured to provide power to the portable electronic device, the power supply control method comprising:
   detecting, by the control circuit, a system status of the portable electronic device or a module status of the power supply module; and
   adjusting, by the control circuit, a reserved battery capacity of a main battery of the power supply module according to the system status of the portable electronic device or the module status of the power supply module;
   increasing, by the control circuit, the reserved battery capacity when a system leakage current of the portable electronic device is larger than a threshold.

2. The power supply control method of claim 1, wherein the control circuit is configured to adjust a ratio of a run-time system battery capacity of an operating system of the portable electronic device to the reserved battery capacity of the main battery according to the system status of the portable electronic device or the module status of the power supply module.

3. The power supply control method of claim 1, wherein the reserved battery capacity of the power supply module is associated with a real-time clock (RTC) circuit.

4. The power supply control method of claim 1, wherein the module status of the power supply module is a battery temperature, a battery health or a voltage of the main battery.

5. The power supply control method of claim 4, further comprising:
   increasing, by the control circuit, the reserved battery capacity when the battery temperature of the main battery of the power supply module is larger than a threshold.

6. The power supply control method of claim 4, further comprising:
   increasing, by the control circuit, the reserved battery capacity when the voltage or the battery health of the main battery of the power supply module is smaller than a threshold.

7. The power supply control method of claim 1, further comprising:
   obtaining, by the control circuit, the system status of the portable electronic device or the module status of the power supply module when the portable electronic device is in a power-off status; and
   adjusting, by the control circuit, the reserved battery capacity of the power supply module according to the system status of the portable electronic device or the module status of the power supply module when the portable electronic device is in a power-on status.

8. The power supply control method of claim 7, wherein when the portable electronic device is in the power-off status, a power of the control circuit is provided by a real-time clock circuit, and the system status of the portable electronic device or the module status of the power supply module is obtained.

9. The power supply control method of claim 1, wherein the control circuit is an embedded controller (EC).

10. A portable electronic device, comprising:
   a power supply module, including a main battery configured to provide power to the portable electronic device; and
   a control circuit, coupled to the power supply module, configured to detect a system status of the electronic device or a module status of the power supply module, and to adjust a reserved battery capacity of the main battery of the power supply module according to the system status of the portable electronic device or the module status of the power supply module;
   wherein the control circuit is configured to increase the reserved battery capacity when a system leakage current of the portable electronic device is larger than a threshold.

11. The portable electronic device of claim 10, wherein the control circuit is configured to adjust a ratio of a run-time system battery capacity of an operating system of the portable electronic device to the reserved battery capacity of the main battery according to the system status of the portable electronic device or the module status of the power supply module.

12. The portable electronic device of claim 10, wherein the reserved battery capacity of the power supply module is associated with a real-time clock (RTC) circuit.

13. The portable electronic device of claim 10, wherein the module status of the power supply module is a battery temperature, a battery health or a voltage of the main battery.

14. The portable electronic device of claim 13, wherein the control circuit is configured to increase the reserved battery capacity when the battery temperature of the main battery of the power supply module is larger than a threshold.

15. The portable electronic device of claim 13, wherein the control circuit is configured to increase the reserved battery capacity when the voltage or the battery health of the main battery of the power supply module is smaller than a threshold.

16. The portable electronic device of claim 10, wherein the control circuit is configured to obtain the system status of the portable electronic device or the module status of the power supply module when the portable electronic device is in a power-off status, and to adjust the reserved battery capacity of the power supply module according to the system status of the portable electronic device or the module status of the power supply module when the portable electronic device is in a power-on status.

17. The portable electronic device of claim 16, wherein when the portable electronic device is in the power-off status, a power of the control circuit is provided by a real-time clock circuit, and the system status of the portable electronic device or the module status of the power supply module is obtained.

18. The portable electronic device of claim 10, wherein the control circuit is an embedded controller (EC).

* * * * *